(12) United States Patent
Savkli

(10) Patent No.: US 10,146,801 B2
(45) Date of Patent: Dec. 4, 2018

(54) APPARATUS AND METHOD FOR DISTRIBUTED GRAPH PROCESSING

(71) Applicant: The Johns Hopkins University, Baltimore, MD (US)

(72) Inventor: Cetin Savkli, Annapolis, MD (US)

(73) Assignee: The Johns Hopkins University, Baltimore, MD (US)

( * ) Notice: Subject to any disclaimer, the term of this patent is extended or adjusted under 35 U.S.C. 154(b) by 598 days.

(21) Appl. No.: 14/797,553

(22) Filed: Jul. 13, 2015

(65) Prior Publication Data

US 2016/0063037 A1    Mar. 3, 2016

Related U.S. Application Data

(60) Provisional application No. 62/044,440, filed on Sep. 2, 2014.

(51) Int. Cl.
*G06F 17/30* (2006.01)

(52) U.S. Cl.
CPC .. *G06F 17/30277* (2013.01); *G06F 17/30424* (2013.01); *G06F 17/30958* (2013.01)

(58) Field of Classification Search
CPC ......... G06F 17/30094; G06F 17/30194; G06F 17/30283; G06F 17/30545; G06F 17/30575; G06F 17/30958
See application file for complete search history.

(56) References Cited

U.S. PATENT DOCUMENTS

| | | | |
|---|---|---|---|
| 2010/0332444 A1* | 12/2010 | Akatsu | G06F 17/5095 706/54 |
| 2012/0188249 A1* | 7/2012 | Kretz | G06N 5/02 345/440 |
| 2013/0151536 A1* | 6/2013 | Akoglu | G06F 17/30327 707/748 |
| 2014/0172810 A1* | 6/2014 | Paradies | G06F 17/30315 707/705 |

* cited by examiner

*Primary Examiner* — Kris E Mackes
(74) *Attorney, Agent, or Firm* — Todd R. Farnsworth

(57) ABSTRACT

A method for distributed graph processing is provided including receiving ingest data from at least one data source, generating, using processing circuitry, a data map comprising a graph of edges between a plurality of data vertices of the ingest data, determining at least two nodes of a cluster, and storing a portion of the ingest data and a portion of the data map at the at least two nodes.

18 Claims, 17 Drawing Sheets

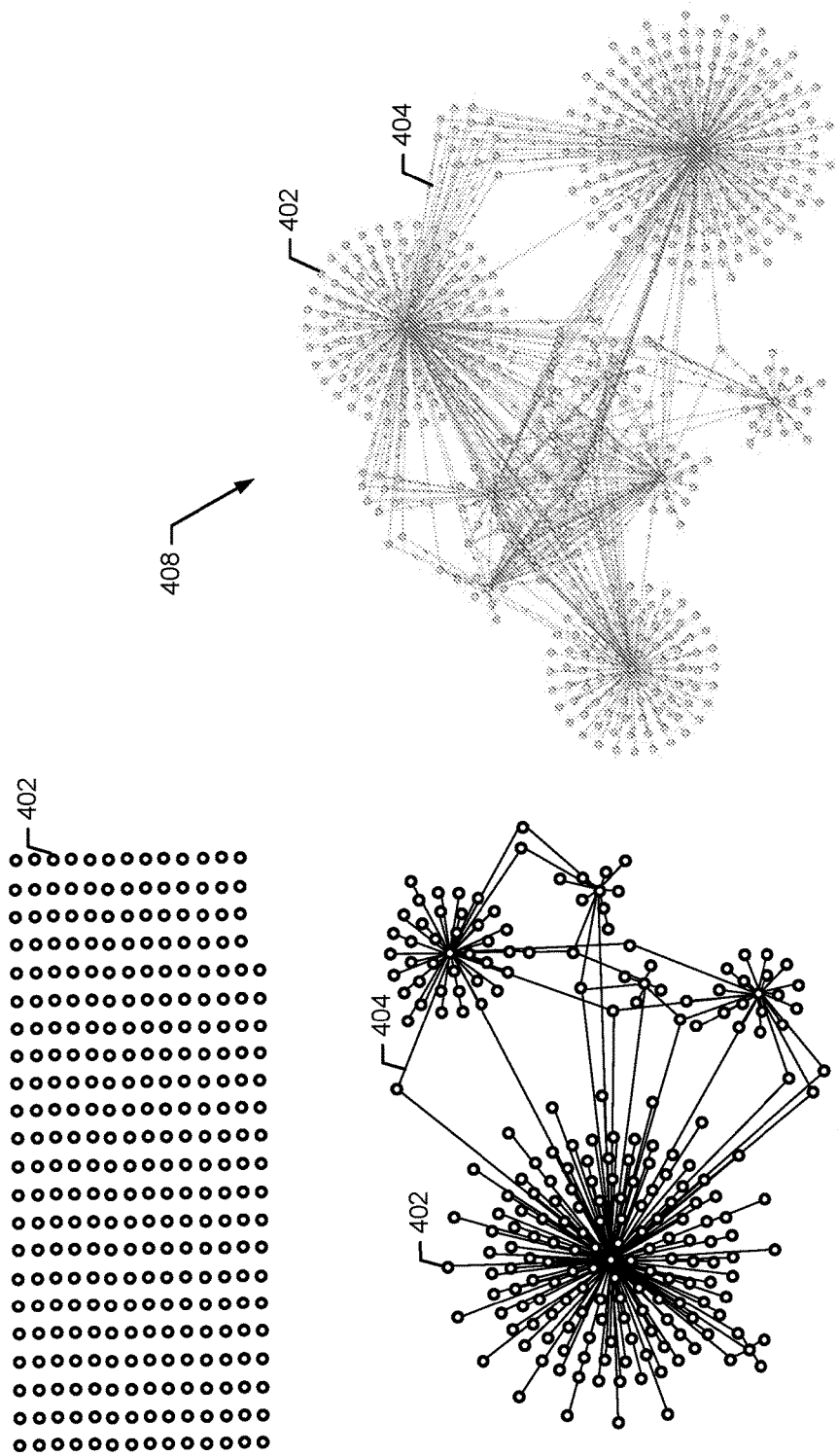

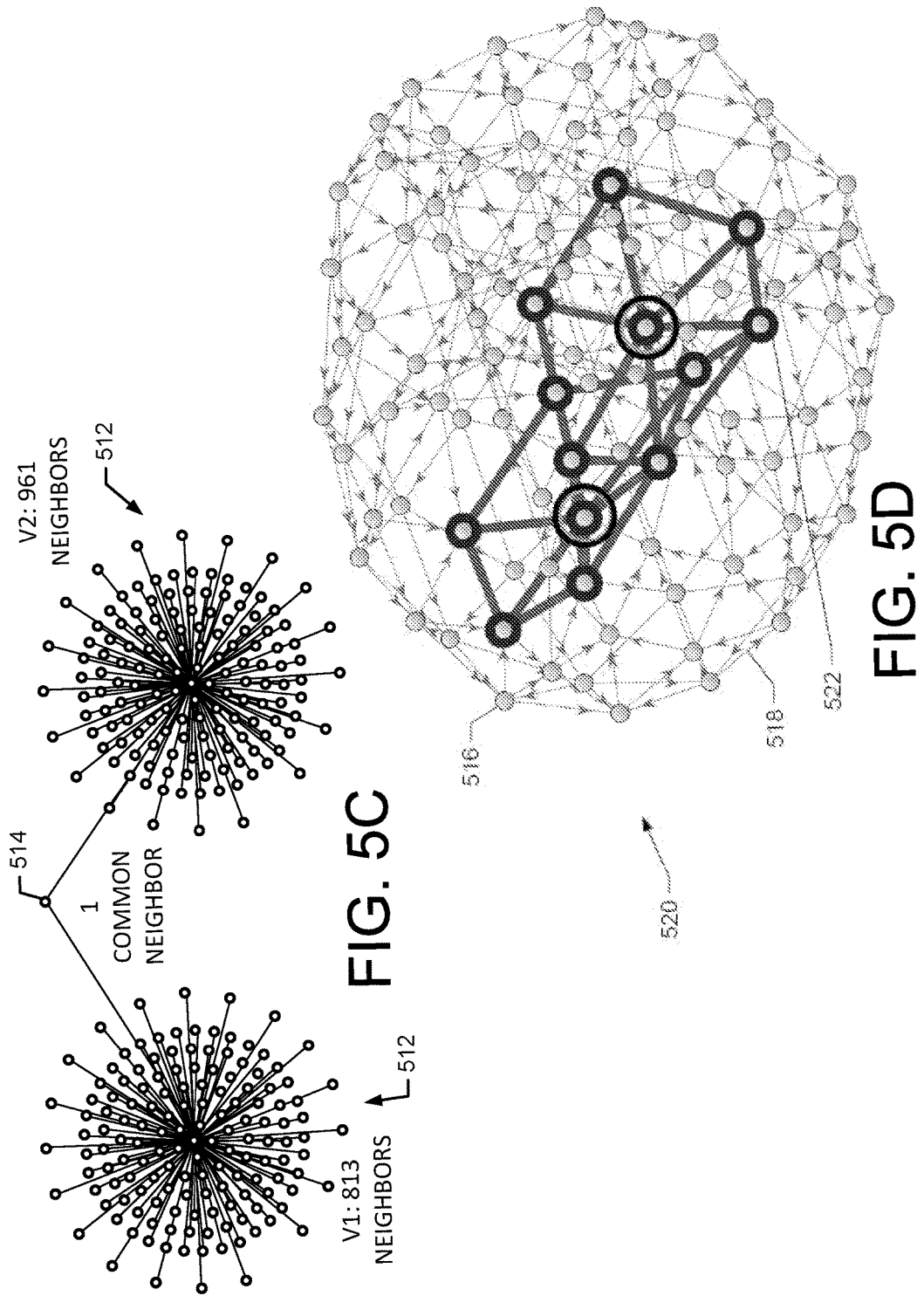

APPARATUS AND METHOD FOR DISTRIBUTED GRAPH PROCESSING

CROSS REFERENCE TO RELATED APPLICATION

This application claims the benefit of U.S. Provisional Application No. 62/044,440 filed on Sep. 2, 2014, the entire contents of which are hereby incorporated herein by reference.

TECHNICAL FIELD

Example embodiments generally relate to data processing and, in particular, relate to distributed graph processing.

BACKGROUND

Graphs provide a flexible data structure that facilitates fusion of disparate data sets. The popularity of graphs has shown a steady growth with the development of internet, cyber, and social networks. While graphs provide a flexible data structure, processing and analysis of large graphs remains a challenging problem. Successful implementation of graph analytics revolves around several key considerations: rapid data ingest and retrieval, scalable storage, and parallel processing.

Recently, NoSQL systems (also known as Not only SQL (Structured Query Language), such as HADOOP®, have become popular for storing big data; however these systems face several fundamental challenges that make analyzing desperate data sets difficult such as 1) lack of secondary indexing, which leads to poor performance of attribute queries; 2) lack of locality control, which can lead to unnecessary movement of data; and 3) lack of well-defined schema, which makes database maintenance challenging. More traditional relational databases, e.g., relational database management system (RDBMS)) may not share the problems identified for NoSQL, but face their own set of challenges when dealing with large data sets that cannot be handled by a single server, table structures may not be flexible enough to support new kinds of data easily, and RDBMSs may have poor parallelization & scalability.

BRIEF SUMMARY OF SOME EXAMPLES

Accordingly, some example embodiments may enable distributed graph processing as described below. In one example embodiment, an apparatus is provided including processing circuitry configured for distributed graph processing including processing circuitry configured for receiving ingest data from at least one data source, generating a data map comprising a graph of edges between a plurality of data vertices of the ingest data, determining at least two nodes of a cluster, and storing a portion of the ingest data and a portion of the data map at the at least two nodes.

In another example embodiment, a method for distributed graph processing is provided including receiving ingest data from at least one data source, generating, using processing circuitry, a data map comprising a graph of relationships between a plurality of data nodes of the ingest data, determining at least two clusters, and storing a portion of the ingest data and a portion of the data map at the at least two clusters.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

FIG. 4A illustrates a node graph of a four computing device cluster archived without locality control;

FIG. 4B illustrates a node graph of a four computing device cluster archived with locality control according to an example embodiment of the present invention;

FIG. 5C illustrates a query of joint vertices of specific vertices according to an example embodiment of the present invention;

FIG. 5D illustrates a query of a subgroup of specific vertices according to an example embodiment of the present invention;

DETAILED DESCRIPTION

Figure 1:
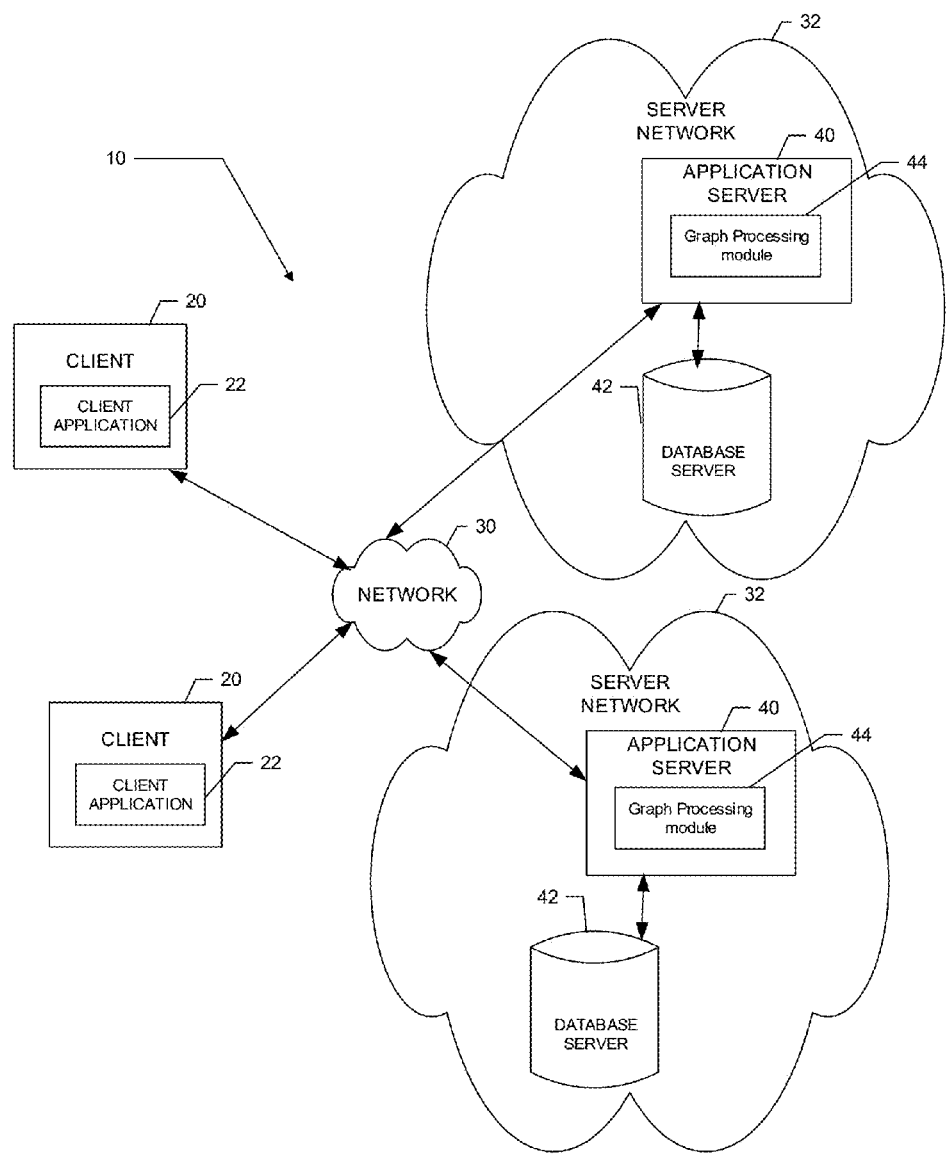
FIG. 1 illustrates a functional block diagram of a system that may be useful in connection with distributed graph processing according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

The term "vertex" as used herein shall be interpreted to mean representation of an entity on a data graph. An entity may be any identifiable person, place, or thing existing digitally or in reality, for example a person, flight, document, email, geographical location, computer, vehicle, or the like.

The term "edge" as used herein shall be interpreted to mean a connection between two entities, e.g., "person-visits-location" where "person" and "location" represent vertices and "visits" represents an edge or in another example company x owns asset y, where "company x" and "asset y" represent vertices and "owns" represents the relationship.

The "attribute" as used herein shall be interpreted to be information regarding an entity. An attribute may be any information describing the entity in a past present or future state. For example, attributes for a person may include: hair color, eye color, occupation, friends, current and prior addresses, spouse, children, favorite food, home town, schools, vehicles, flights taken places visited, or the like.

The term "graph" as used herein shall be interpreted to mean a digital structure representing entities and associated edges.

The term "node" as used herein shall be interpreted to mean a computing device storing at least a portion of the graph.

The term "cluster" as used herein shall be interpreted to mean group of nodes which store the entire graph.

In some examples, the present invention may provide an apparatus and method which facilitates the development and analysis of large scale attribute rich graphs. The method combines the key features of NoSQL and RDBMS approaches and avoids the problems discussed above in regards to each. In some example embodiments of the method data may be modeled as a property graph, which may support representation of different types of data using a simple extendable database schema. In an example embodiment, the method may distribute storage and processing functionality to execute algorithms on each cluster node and merge results with minimal inter-node communication. In an example embodiment, the method may index each attribute associated with the respective nodes which may, in turn, allow fast random access and analytics.

In some example embodiment, the method may distribute management, e.g., the respective node or group or nodes are not centrally managed. In an example embodiment, the graph vertices, or subgraphs may be stored on specific machines, which may allow for minimization of data movement in graph analytics. In some example embodiments, the method may be platform independent, e.g., can be run on any computing platform, such as in a virtual machine, for example a Java Virtual Machine. In an example embodiment, the method may use property graph model interface, such as the Blueprints graph application program interface (API), allowing analytics to be easily adapted to and from other storage system with a property graph model interface.

The method may be beneficial for attribute rich data, e.g., data which includes many labels on both vertices and edges. Large graph processing libraries, such as Twitter's Cassovary, FlockDB, and Pegasus, may be fast at processing structural graphs, however, they do not leverage or provide facilities to store or use labels on edges or vertices besides edge weights. Current graph benchmarking tools, such as HPC ScalableGraph Analysis Benchmark (HPC-SGAB) may generate tuples of data with the form <StartVertex, EndVertex, Weight> with no other attributes, which may be complementary to Cassovary or Pegasus, however, such benchmarks tend to ignore the functionality of the relational graph.

Knowledge Discovery Toolbox (KDT) is a python toolbox built on Combinatorial BLAS, a linear algebra based library. A linear algebra adjacency matrix approach is similar to Pegasus or GraphLab, however, KDT enables the use of attributes through filtering. Users may create queries or filters on an input graph that may generate a new adjacency matrix that is used by Combinatorial BLAS. However, this filtering process on large graphs can be expensive and lead to storage issues; KDT also requires that the adjacency matrix fit into distributed main memory.

Dynamic Distributed Dimensional Data Model (D4M) is a database and analytics platform built using Matlab built on various tuple stores, such as ACCUMULO® or HBASE®. D4M combines the advantages of distributed arrays, tuple stores, and multi-dimensional associative arrays. D4M focuses on mathematical operations on associative arrays, which Graphs or adjacency matrices can be represented as, but may not be suited for property graphs and traditional edge or vertex operations.

Other graph databases focus more on content or tend to model specific relationship types, such as those in an ontology. These databases include Jena, OpenLink Virtuoso, R2DF and other commercial offerings which may use Resource Description Framework (RDF), which was originally designed to represent metadata. RDF expressions consist of triples (subject, predicate and object) that are stored and queried against. The predicate in each triple represents a relationship between a subject and object. Intuitively, a general set of RDF tuples can be considered a graph although RDF is not formally defined as a mathematical concept of a graph.

The method for distributed graph processing may extend the property graph model interface, e.g., Blueprints graph API, to offer enhanced graph processing functionality that includes locality control, additional graph methods facilitating graph analytics, as well as a parallel processing capability. The method for distributed graph processing may be built upon a cluster of SQL databases, storing main data objects and associations as key-value pairs. The method for distributed graph processing may utilize many tables in which each attribute is stored as value and the identifier (ID) (of a node or edge) as the key. This schema removes, joins, and associates memory and performance bottlenecks, such as query planning or combinatorial explosions, in the case of outer joins.

Example System

An example embodiment of the invention will now be described in reference to FIG. 1, which illustrates an example system in which an embodiment of the present invention may be employed. As shown in FIG. 1, a system 10 according to an example embodiment may include one or more client devices (e.g., clients 20). Notably, although FIG. 1 illustrates two clients 20, it should be appreciated that a single client or many more clients 20 may be included in some embodiments and thus, the two clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The example described herein will be related to an asset comprising a computer or analysis terminal to illustrate one example embodiment. However, it should be appreciated that example embodiments may also apply to any asset including, for example, any programmable device that is capable of receiving and analyzing files as described herein.

The clients 20 may, in some cases, each be associated with a single organization, department within an organization, or location (i.e. with each one of the clients 20 being associated with an individual analyst of an organization, department or location). However, in some embodiments, each of the clients 20 may be associated with different corresponding locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for distributed graph processing, as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application servers 40), and/or a database servers 42, which together may form respective elements of a server network 32. Notably, although FIG. 1 illustrates two server networks 32, it should be appreciated that a single server network or many more server networks 32 may be included in some embodiments and thus, the two server networks of FIG. 1 are simply used to illustrate a potential for a multiplicity of server networks and the number of server networks 32 is in no way limiting to other example embodiments. In this regard, example embodiments are scalable to inclusion of any number of server networks being tied into the system 10. Similarly, a network server may have one or a plurality of Application servers 40 and/or database servers 42. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information descriptive of selection options (e.g., selection trees, GUI button sets, or the like). In some cases, these contents may be stored in the database server 42. Alternatively or additionally, the application server 40 may be configured to provide analytical tools for use by the clients 20 in accordance with example embodiments.

In some embodiments, for example, the application server 40 may therefore include an instance of a graph processing module 44 comprising stored instructions for handling activities associated with practicing example embodiments as described herein. As such, in some embodiments, the clients 20 may access the graph processing module 44 online and utilize the services provided thereby. However, it should be appreciated that in other embodiments, the graph processing module 44 may be provided from the application server 40 (e.g., via download over the network 30) to one or more of the clients 20 to enable recipient clients to instantiate an instance of the graph processing module 44 for local operation. As yet another example, the graph processing module 44 may be instantiated at one or more of the clients 20 responsive to downloading instructions from a removable or transferable memory device carrying instructions for instantiating the graph processing module 44 at the corresponding one or more of the clients 20. In such an example, the network 30 may, for example, be a peer-to-peer (P2P) network where one of the clients 20 includes an instance of the graph processing module 44 to enable the corresponding one of the clients 20 to act as a server to other clients 20. In a further example embodiment, the graph processing module 44 may be distributed amongst one or more clients 20 and/or the application server 40.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the graph processing module 44 configured to operate in accordance with an example embodiment of the present invention. In this regard, for example, the graph processing module 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which analysts may interact with, configure or otherwise maintain the system 10.

As such, the environment of FIG. 1 illustrates an example in which provision of content and information associated with the rendering such as, for example, security or intelligence operations may be accomplished by a particular entity (namely the graph processing module 44 residing at the application server 40). However, it should be noted again that the graph processing module 44 could alternatively handle provision of content and information within a single organization. Thus, in some embodiments, the graph processing module 44 may be embodied at one or more of the clients 20 and, in such an example, the graph processing module 44 may be configured to handle provision of content and information associated with analytical tasks that are associated only with the corresponding single organization. Access to the graph processing module 44 may therefore be secured as appropriate for the organization involved and credentials of individuals or analysts attempting to utilize the tools provided herein.

Example Apparatus

Figure 2:
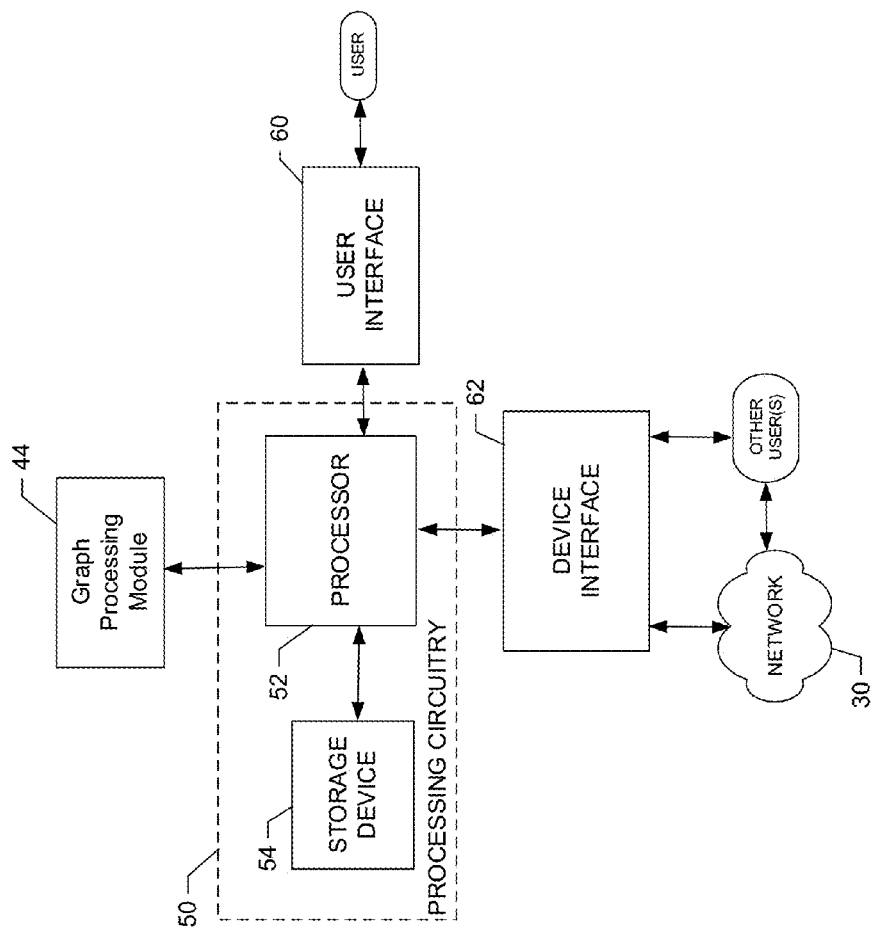
FIG. 2 illustrates a functional block diagram of an apparatus that may be useful in connection with distributed graph processing according to an example embodiment.

An example embodiment of the invention will now be described with reference to FIG. 2. FIG. 2 shows certain elements of an apparatus for distributed graph processing according to an example embodiment. The apparatus of FIG. 2 may be employed, for example, on a client (e.g., any of the clients 20 of FIG. 1) or a variety of other devices (such as, for example, a network device, server, proxy, or the like (e.g., the application server 40 of FIG. 1)). Alternatively, embodiments may be employed on a combination of devices. Accordingly, some embodiments of the present invention may be embodied wholly at a single device (e.g., the application server 40 or one or more clients 20) or by devices in a client/server relationship (e.g., the application server 40 and one or more clients 20). Furthermore, it should be noted that the devices or elements described below may not be mandatory and thus some may be omitted in certain embodiments.

Referring now to FIG. 2, an apparatus configured for distributed graph processing is provided. The apparatus may be an embodiment of the graph processing module 44 or a device hosting the graph processing module 44. As such, configuration of the apparatus as described herein may transform the apparatus into the graph processing module 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the graph processing module 44, which may be any means, such as, a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the graph processing module 44 as described below.

The graph processing module 44 manager may include tools to facilitate distributed graph processing via the network 30. In an example embodiment the graph processing module 44 may be configured for receiving ingest data from at least one data source, generating a data map including a graph of edges between a plurality of data vertices of the ingest data, determining at least two nodes of a cluster, and storing a portion of the ingest data and a portion of the data map at the at least two nodes. In an example embodiment, the portion of the ingest data stored on a respective node of the at least two nodes is based on a specific data attribute. In some example embodiments, the graph processing module 44 may be further configured for receiving a query, causing transmission of the query to the at least two nodes, receiving query results from the at least two nodes, and unifying the query results. In an example embodiment, the graph processing module 44 may be further configured for causing the unified query results to be displayed. In an example embodiment, the query includes at least one structural constraint and at least one semantic constraint. In some example embodiments, a node includes a computing device.

In an example embodiment, generating the data map includes generating a vertex table and an edge table based on the ingest data. In some example embodiments, the generating the map data also includes defining the plurality of vertices and at least one relational edge between respective vertices of the plurality of vertices. In an example embodiment, storing the portion of ingest data and the portion of map data includes storing a respective vertex of the plurality of vertices to the respective node of the at least two nodes, and one or more attributes associated with the respective vertex is stored at the node at which the respective vertex is stored. In some example embodiments, the determining the at least two nodes is based on the storing the plurality of vertices such that vertices sharing at least one attribute are stored in a common node.

Example Distributed Graph Processing

An example embodiment will now be described in general terms in relation to distributed graph processing. A computing device, such as the apparatus of FIG. 2, may receive ingest data from one or more databases, such as storage device 54. The ingest data may be in tabulated format, such as a spreadsheet, or other files such as websites, documents or the like. The ingest data may be in a single or multiple files. The computing device may extract vertices from the ingest data, such as names of persons, flight numbers, origin city, and departure city. In an instance in which the ingest data is not in a relational form, the computing device may determine or convert the ingest data into a relational form, such as a relational table or matrix. The computing device may generate map data including a graph of the relationships, e.g., edges between each vertex of the ingest data. The map data may include a vertex table and an edge table. The vertex and edge table may also include attribute tables associated with each edge and/or each vertex.

The computing device may determine a cluster including at least two nodes at which to store the vertices and the map data. The computing device may store all information about a vertex, such as the vertex attributes at the node which stores the respective vertex, to minimize movement of data. The computing device may determine a vertex attribute to arrange the graph and or sort the storage of vertices. For example, a graph of persons flying on a particular day may be arranges by origin or departing city, by flight number, or by passengers, resulting in markedly different graphs. The selected attribute by which the graph is sorted may be the attribute with may result in a graph with the least probable movement of the data when a query is run, for example a social media graph may be arranged based on location of the persons. The graph, e.g., the vertices and map data, may be partitioned, such as by longitude and latitude into subgraphs which are stored on the nodes of the cluster. In an example embodiment, the partitions of the graph may be executed at points which subgraph nodes have the fewest common neighbors.

Figure 3A:
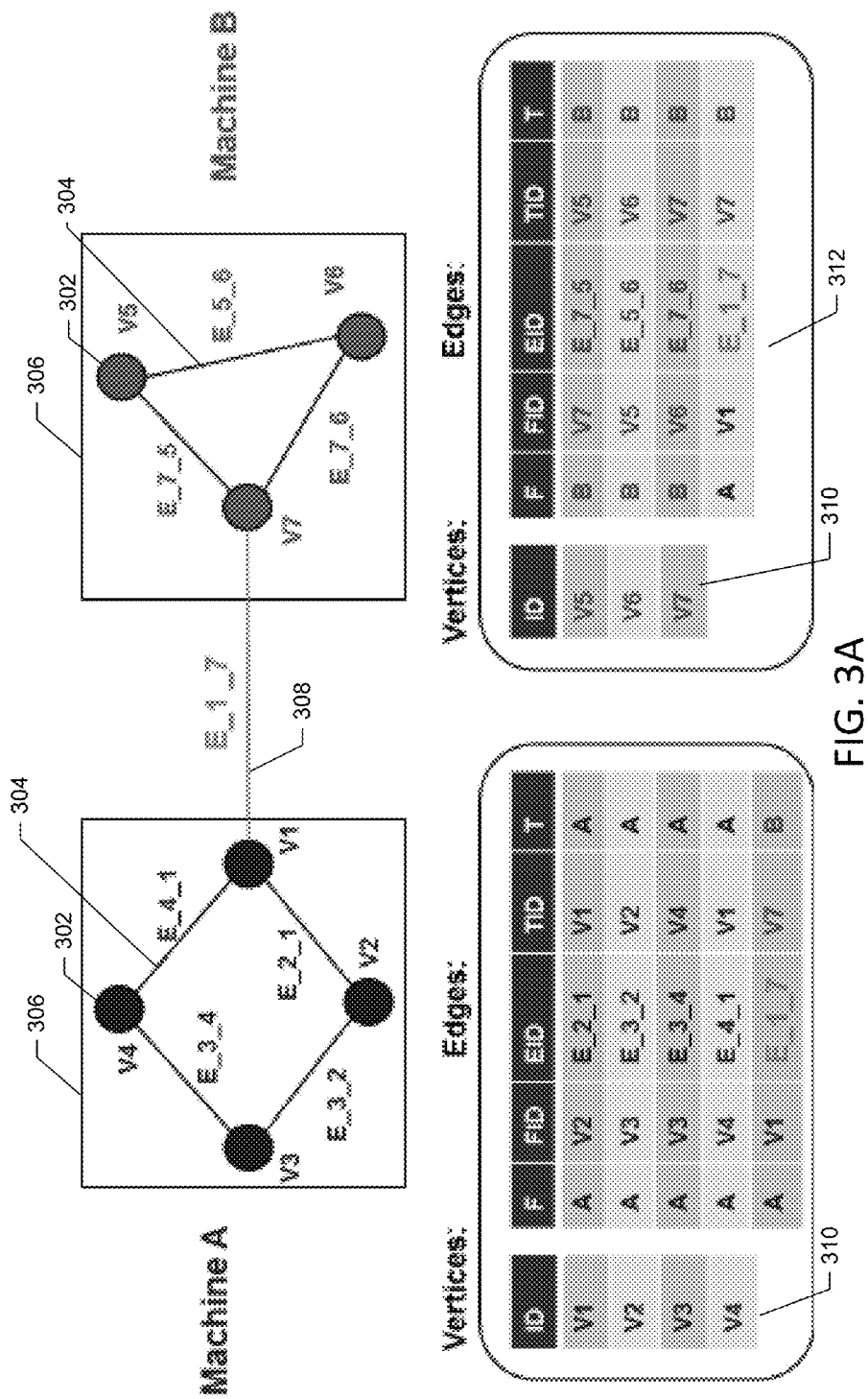
FIG. 3A illustrates a storage schema in a two node cluster according to an example embodiment of the present invention.

FIG. 3A illustrates a storage schema in a two node cluster according to an example embodiment of the present invention. Each node 306 may include one or more vertices 302 and edges 304 between the respective vertices.

Structural graph information may be stored in two tables on each node: a vertex table 310 containing only the IDs of the vertices 302, stored on the node, and an edge table 312 containing, for every edge 304 connected to a vertex in the vertex table 310: an edge ID; the IDs of both connected vertices; and identifiers specifying which node each connected vertex is stored on. Each vertex may be stored on only one node, while each edge may be stored on either one node (such as E_4_1 or E_7_5), in an instance in which the both vertices are stored on the same node; or two nodes (such as E_1_7), in an instance in which the vertices to which the edge is connected are stored on different computing devices, e.g., nodes. In an instance in which the vertices 302 connected by an edge 304 are stored on two different nodes, such as edge 308, the edge may be stored on both nodes which the vertices is stored. Edges may be directed, but the edge direction may be ignored by undirected graph algorithms.

For each attribute present on any vertex or outgoing edge on a node, a two-column table may be stored consisting of <id, val> tuples, where id is either a vertex or edge identifier and val is the value of the attribute. Storage of the two column table may allow each attribute to be independently indexed and queried, while avoiding the complexity typically associated with table structure changes in relational databases.

Figure 3B:
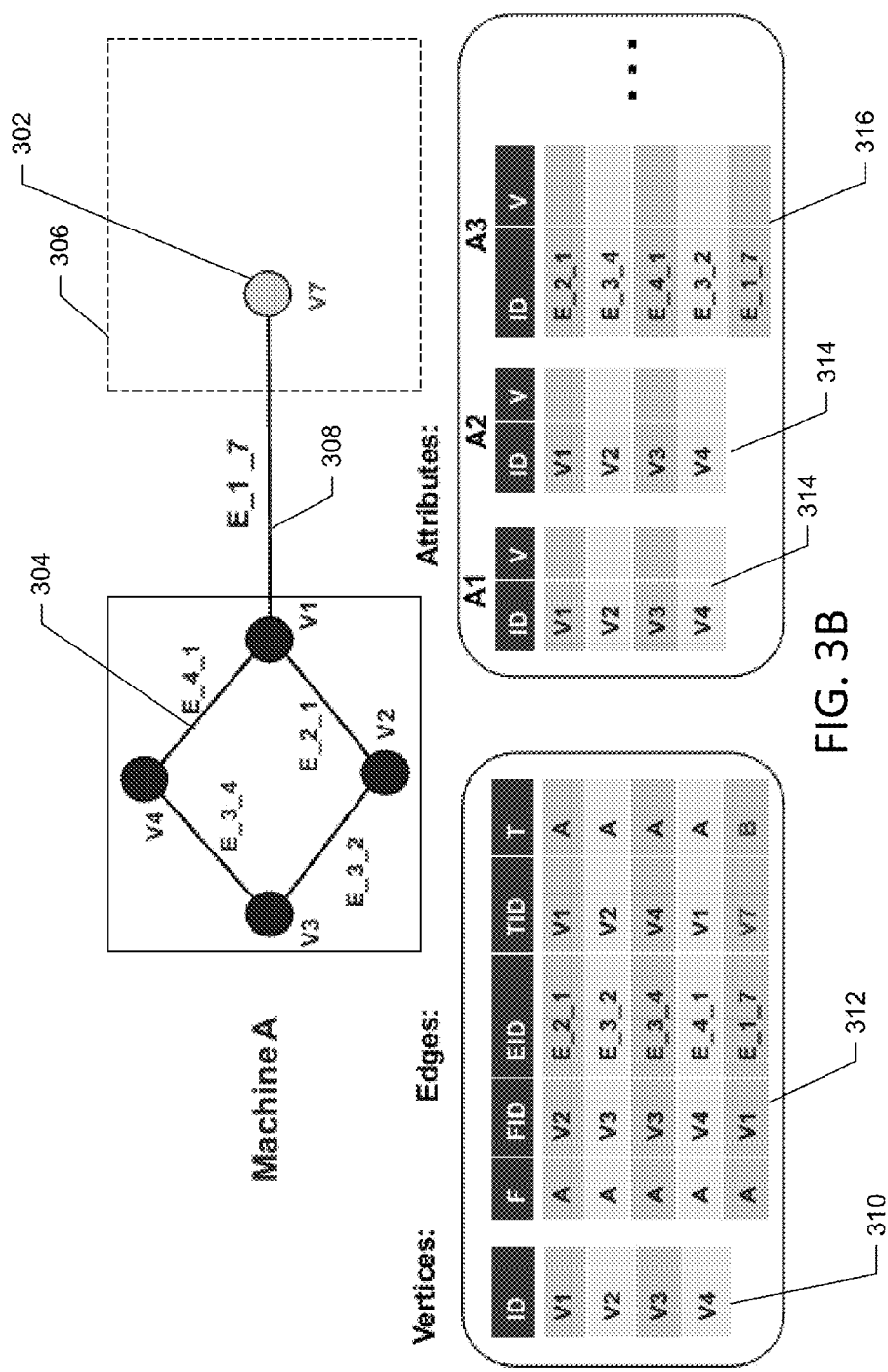
FIG. 3B illustrates attribute tables associated with a node according to an example embodiment of the present invention.

FIG. 3B illustrates attribute tables associated with a node according to an example embodiment of the present invention. An attribute table 314 may be generated and stored for each vertex 302 and/or edge 304 attribute. An attribute may be any value associated with the vertex, for example if a vertex is associated with a person, attribute data may include height weight, hair color, home town, occupation, residence, or the like. The attribute table may include a two column table, which, in turn includes a primary key, which identifies a graph element (such as a vertex or an edge) uniquely, and a value. Each attribute of a vertex 302 may be stored on the node at which the vertex is stored. Attributes of an Edge 304 may be stored on each node at which the edge originates. Attributes may be typed or classified, such as height or weight in the example of a person, or origination, company, or destination in a transportation example, such as flight bus or the like. In some example embodiments, the attributes may be typed automatically.

FIG. 4A illustrates a graph 400 of a four node cluster archived without locality control. Distributed graph processing may support locality control, e.g., storing vertices of the graph to specific nodes. The node level access to the graph allows for partitioning of the graph which minimizes edge crossing between computing devices, e.g., nodes. For example, the graph 400 depicted in FIG. 4A may be generated using a Brightlike data set, without locality control. The vertices 402 at the top of the node graph 400 have no edges 44 and have no neighbors on the local machine. In this example, the probability of a neighbor being stored on the same computing device is approximately 25%, which is reflected in the graph 400 having approximately 25% of the vertices with local neighbors.

In contrast, FIG. 4B illustrates a graph 408 of a four node cluster archived with locality control according to an example embodiment of the present invention. The graph 408 illustrates a subgraph on the same node using locality controls. The vertices 402 are stored with the maximum edges 404 connections minimizing the number of edges which are stored on two nodes, e.g., connect vertices stored on two different computing devices, which enables more efficient computation of graph algorithms. Distributed graph processing may place graph vertices on particular nodes, which may also be utilized to automatically partition the graph data in an instance in which attributes may be hashed to generate a machine ID, such as partitioning the graph based on latitude-longitude attributes of the vertices. Distributed graph processing may also provide advanced query, for example, finding joint neighbors of a pair of vertices is a key operation for a variety of link discovery analysis. Distributed graph processing may provide a function to find joint neighbors of a pair of vertices using a single database query to the edge table on each computing device, discussed below in FIG. 5E. Querying the edge tables of each node may be accomplished without any communication between cluster nodes. The single query to the edge table may also be more computationally efficient than iterative querying the neighbors of each vertex on the node or nodes.

Figure 4C:
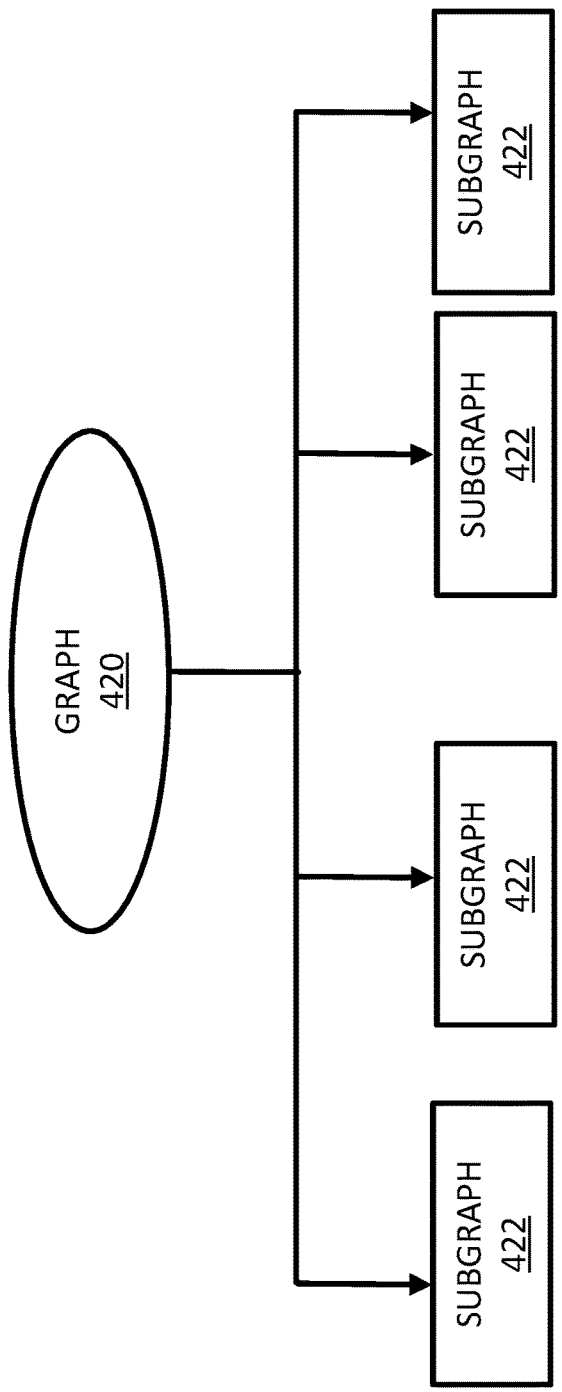
FIG. 4C illustrates a data graph and several subgraphs according to an example embodiment of the present invention.

FIG. 4C illustrates a graph and several subgraphs according to an example embodiment of the present invention. The graph 420 may include vertices 302 and edges 304 as depicted in FIG. 3A. The graph may be partitioned into subgraphs 422 allowing control of the locality of the vertices in the cluster. In some example embodiments, neighbors may be localized for efficient graph analysis. In addition or alternatively to partitioning subgraphs 422 of query results may graphically depict the relationship of the data within the graph, and allow for parallel query processing, as discussed below.

Distributed graph processing may also provide a function to query for all instances of a small subgraph, which can include structural constraints (e.g., which vertices connect and which vertices do not connect via one or more edges) as well as semantic constraints (e.g., constraints on vertex and edge attributes). The size of the subgraph query may vary depending on the strength of its constraints and the complexity of the underlying data. The distributed graph processing search algorithm may aggressively prune its search space.

Traditional reference algorithms use memory proportional to the size of the data graph. Distributed graph processing uses memory proportional to the size of the query graph multiples by a branch factor, e.g., the number of parallel nodes, executing the query. Distributed graph processing may be fully parallelized, e.g., a local search based on the query is performed at respective nodes. In an example embodiment, the subgraphs may be less than or about 10 vertices, even in large data sets.

The parallelization of the distributed graph processing may be based on an isomorphism testing algorithm, which may be similar to VF2 algorithm adapted to utilize Dgraph and/or JGraph models discussed below.

Figure 5A:
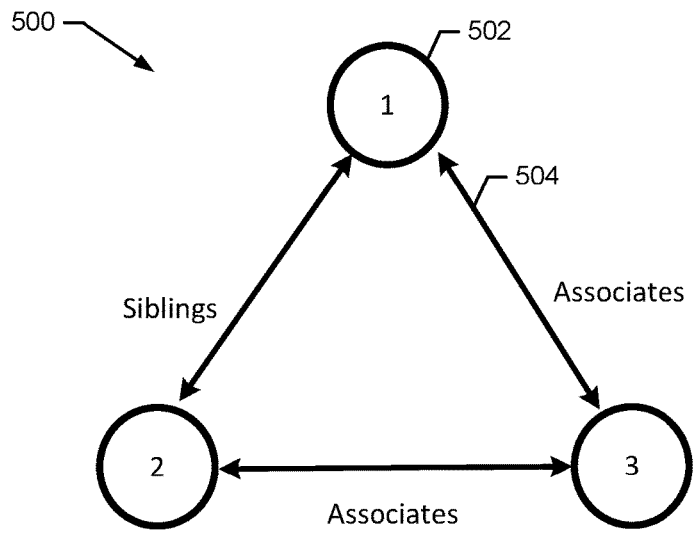
FIG. 5A illustrates a query subgraph including structural and semantic constraints according to an example embodiment of the present invention.

FIG. 5A illustrates a query subgraph including structural and semantic constraints according to an example embodiment of the present invention. The query sub graph structural constraints may be entered by selecting a number of vertices and indicating connections, such as by selection menus, drawing using a pointing device, drag and drop elements, or the like. The query subgraph 500 includes structural constraints including three vertices 502, each vertex connected, by and edge 504, to the other two vertices. Although, the depicted query subgraph 500 includes three vertices 502 connected by three edges 502, any number of vertices and or connective arrangements may define a query subgraph. The query subgraph 500 also includes semantic constraints one or more of the vertices and the edges. The vertex semantic constraints are defined as persons of interest 1, 2, and 3. Person of interest 1 includes attributes "Brown hair, weight 120-140 kilograms (kg), and height 150-170 centimeters (cm). Person of interest 2 includes attributes "Brown hair, weight 90-110 kg, and height 190-210 cm. Person of interest 3 includes attributes "No beard, weight 80-100 kg, and height 185-200 cm. The edge semantic constraints are defined as "siblings" between person of interest 1-2, and "associates" between vertices 2-3 and 1-3.

Figure 5B:
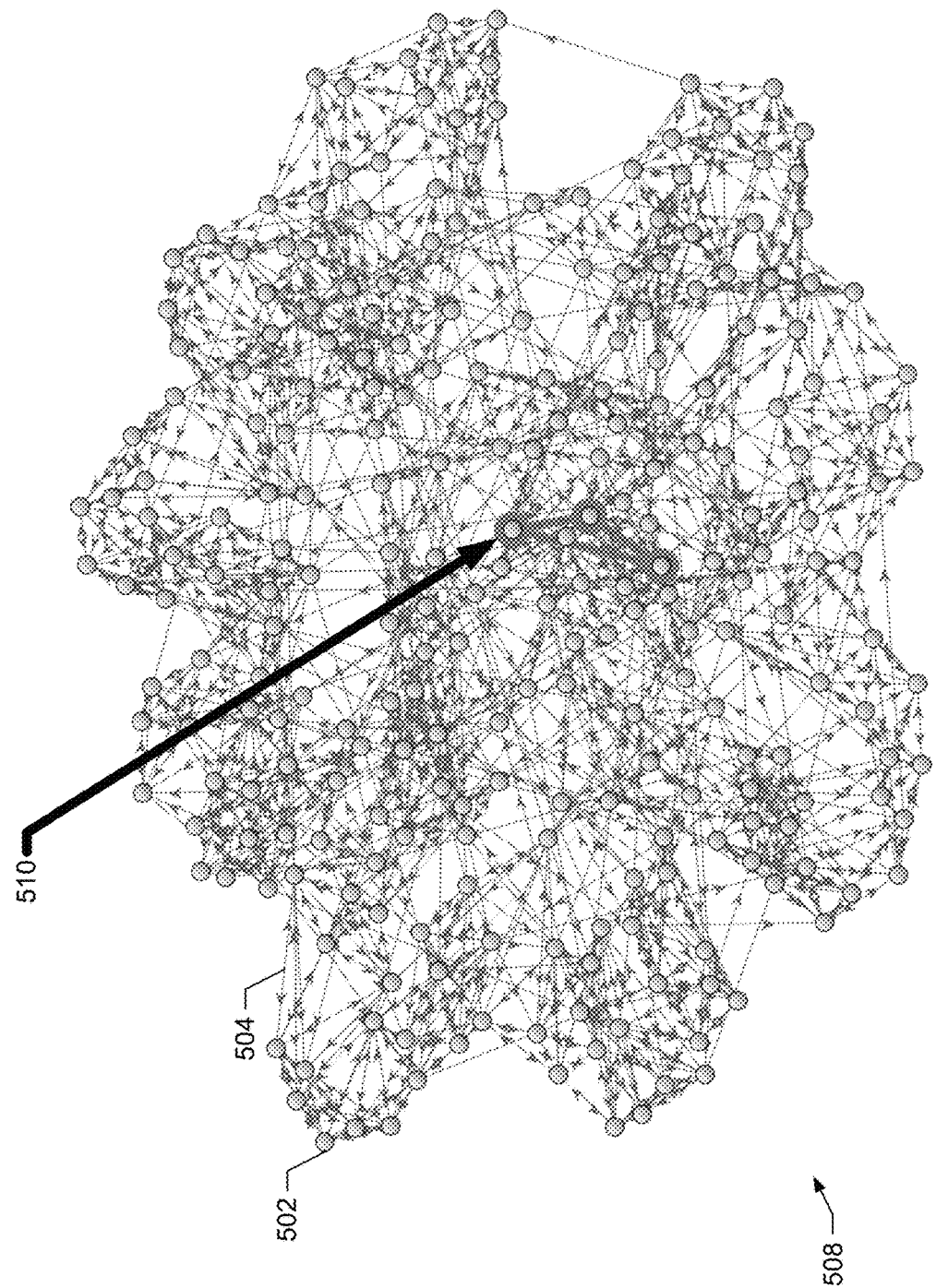
FIG. 5B illustrates data graph with a query subgraph match instance indicated according to an example embodiment of the present invention.

FIG. 5B illustrates graph with a query subgraph match instance indicated according to an example embodiment of the present invention. A query subgraph, such as query subgraph 500 of Figure A, may be received and sent to each of the computing devices. The computing device may query the vertex table and or the edge table of the portion of the graph stored at each computing device and receive the query results. In an instance in which more than one computing device returns a match or a partial match, the results may be unified. The graph 508 includes the underlying vertices 502 and edges 504. The query subgraph match 508 is indicated by the shading of the three vertices 502 and connecting edges 504.

FIG. 5C illustrates a query of joint vertices of specific vertices according to an example embodiment of the present invention. The query may include a request for common neighbors of V1 and V2, for example graph.getJointNeighbors(V1,V2). The subgraphs 512 are the neighbors of V1 and V2, including the one common neighbor 514. Distributed graph processing may execute the query by comparing the edge tables portions associated with each vertex, without movement of data. In contrast, a traditional graph API may utilize a neighbor query such as, vertex.getNieghbors(V1, V2), which may move the 813 neighbors of V1 and the 961 neighbors of V2 for comparison, leading to massive computational load.

FIG. 5D illustrates a query of a subgroup of specific vertices according to an example embodiment of the present invention. The subgroup query may include identifier for the vertices, and a number of "hops", e.g., number of vertices from the originating vertex. For example, the query may be graph.clonesubgraph(V1, V2; 1), requesting a graph result cloning the subgraph including the subgroup of vertex V1 and V2 and the vertexes which are 1 hop from vertex V1 or V2. The graph 512 includes vertices 516 and edges 518. The specified vertices of the subgroup 522 have been indicated by the circle around each. The subgroup subgraph 522 is indicated by the darkened vertices and edges. The cloning of a subgraph may be executed without moving data between nodes. The query may be executed on each vertex table identifying the specified vertex and using the edge tables identifying vertices which are within the hop number. In an instance in which the subgroup vertices are stored on more than one node, the query result may be unified based on common edges. Cloning of a subgroup query may provide additional efficiency in running algorithms by reducing dimensionality of the graph.

Figure 5E:
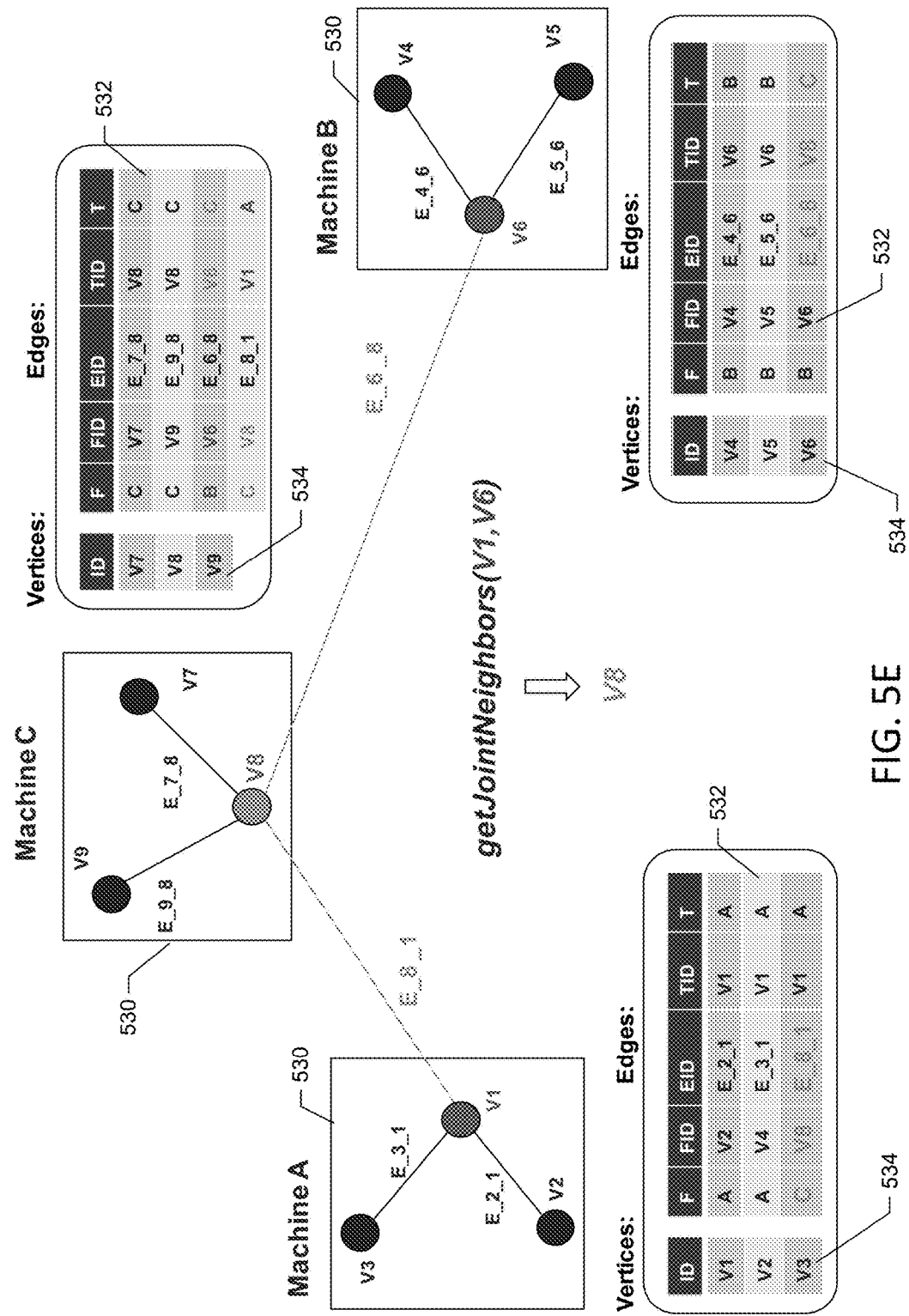
FIG. 5E illustrates an example of query of a joint neighbor with vertices on multiple nodes according to an example embodiment of the present invention.

FIG. 5E illustrates an example of query of a joint neighbor with vertices on multiple nodes according to an example embodiment of the present invention. The graph may be distributed over a plurality of nodes 530. The portion of the graph stored at each node, e.g., subgraph 532 may include vertices table 534, edge tables 532, and associated attribute table. A query may be entered at one of the nodes 530, such a machine A of machine A, B, and C. In an example embodiment, the query may be getJointNeighbors(V1, V6). Machine A may include vertices V1, V2, and V3; Machine B may include vertices V4, V5, and V6; and Machine C may include vertices V7, V8, and V9. Each node 530 may check the local edge table 532 for vertices V1 and V6. The nodes 530, e.g., machine A and C may both return the result E_8_1, indicating that machine A includes V1 which is connected to V8 stored on machine C. Computing devices 530, e.g., machine B and C may both return the result E_6_8, indicating that machine B includes V6 which is connected to V8 stored on machine C. The results may be unified at a node 530, such as the computing device initiating the query. In present example the results identify V1 and V6 having a joint neighbor of V8.

Figure 6A:
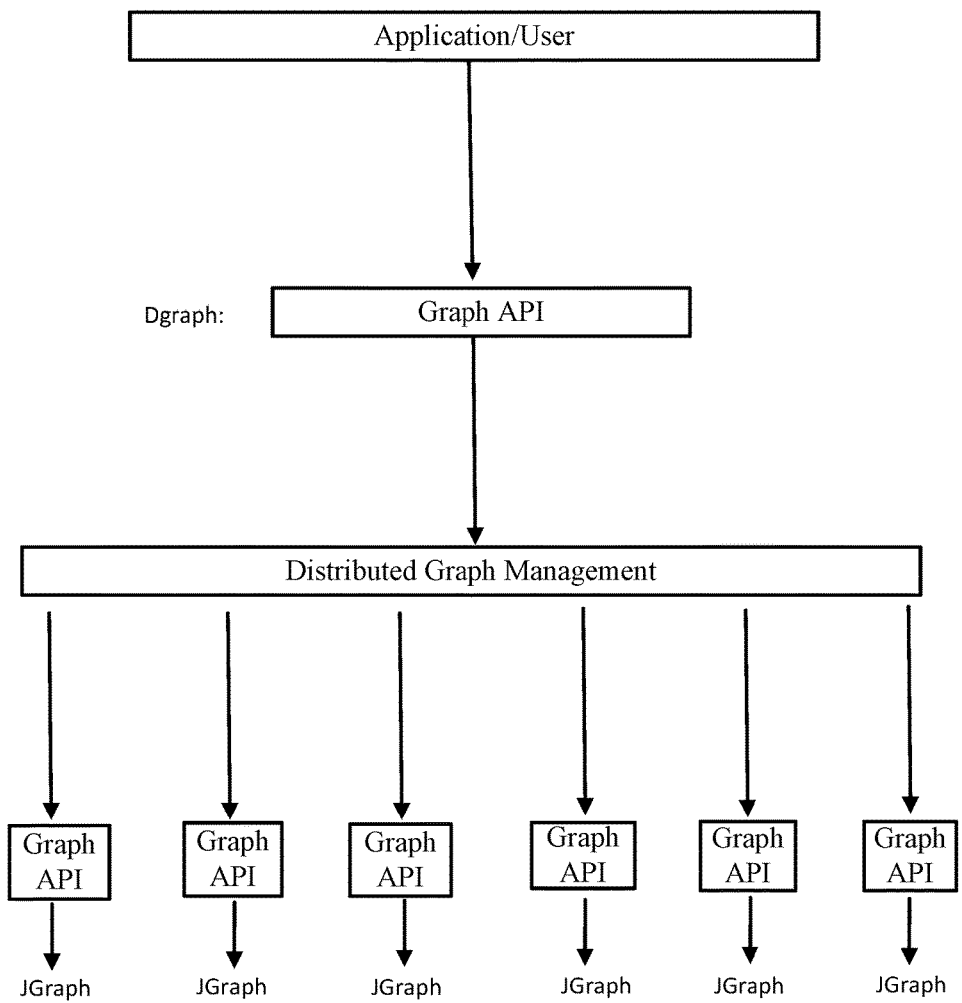
FIG. 6A illustrates an example of data access in distributed graph processing according to an example embodiment of the present invention.

FIG. 6A illustrates an example of data access in distributed graph processing according to an example embodiment of the present invention. A user or application may access the graph API, for example a Dgraph. The query may be submitted to distributed graph management. Communication may be in a Java database connectivity technology, such as JDBC (Java Database Communication). Each node, or in some instances group of nodes, may include a server which may process the query in parallel using a graph API such as Jgraph.

Figure 6B:
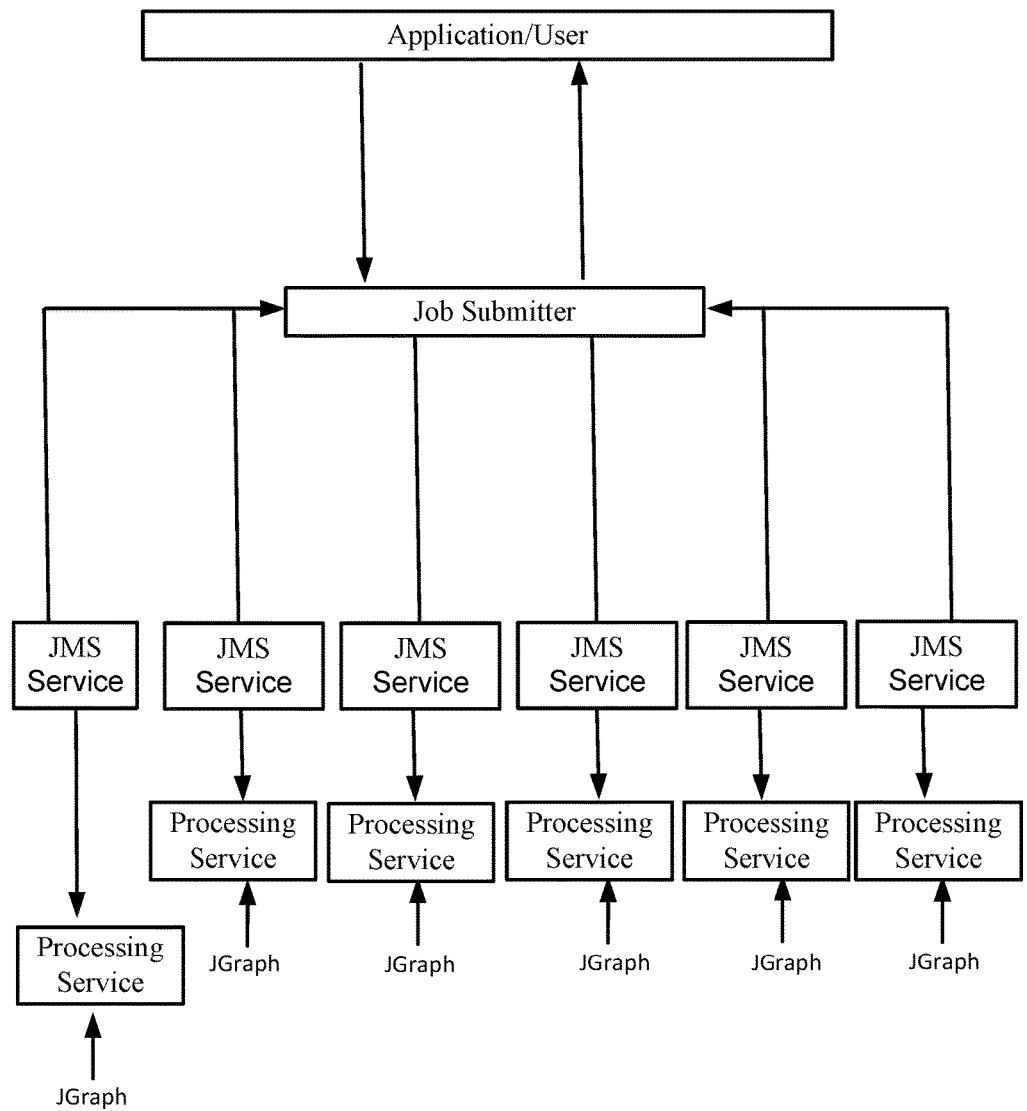
FIG. 6B illustrates an example of distributed graph data processing according to an example embodiment of the present invention.

FIG. 6B illustrates an example of distributed graph data processing according to an example embodiment of the present invention. Queries may be submitted by an application or user at a computing device using a job submitter, e.g. a functionality that manages parallel processing job submissions. A parallel job may execute logic on a portion of the graph in each node. The job submitter may communicate with a processing service at each node. The communication may be a message service, such as Java message service (JMS). Results of the query may be returned to the job submitter by each of the nodes. The results may be unified at either the job submitter or at the node.

A primary challenge in parallel processing of graphs is that, for most nontrivial problems, analysis on each machine, e.g., node on the cluster requires access to data on other machines to be able to produce a result. Distributed graph processing may process a graph or portions of a graph in parallel without having to move data between nodes storing the data.

Distributed graph processing may utilize an algorithm that which may take advantage of distributed hardware wherever possible. In some embodiments distributed graph processing may utilize models of parallel processing over the distributed graph, such as DGraph, JGraph, Neighborhood, or any other parallel processing model. Each parallel processing model type may provide a different tradeoff between ease of algorithm implementation, parallelism of client code, and network communication, which allows various users to select the model which best suits the needs of their algorithm.

In an instance in which DGraph class parallel processing is implemented, a property graph model interface, such as Blueprint API abstracts the distributed nature of the underlying graph. Methods of the DGraph class are implemented with parallel calls to the underlying database where possible, but all results are sent back to the client computing device and no client code runs on other computing devices, e.g., nodes storing portions of the graph. The Dgraph class of parallelism may be suitable for developing analytics that need a global view of the graph or make only simple queries, such as finding vertices with a specific attribute, for example 'find all vertices with attribute "last_name" equal to "Smith".

In an instance in which JGraph class parallel processing is implemented, distributed graph processing may allow clients to create processing jobs, e.g., queries, which may be submitted to the nodes to run in parallel on each node of the cluster; each job is given access to the JGraph local to the computing device the query is being run on, as illustrated In FIG. 6A. A JGraph is another implementation of the property graph model interface, such as Blueprints API, which may represent the subgraph stored on its local node. Vertex iterators used in parallel jobs on JGraphs may iterate over vertices that are local in that computing device, however any queries relative to local vertices, such as getNeighbors( ) operation, may retrieve all matching results independent of where they are located, e.g., the local computing device or other computing device storing a portion of the graph.

The JGraph class of parallelism may be suitable for developing analytics which may make use of a wide view of the graph as well as benefit from parallelism, such as subgraph isomorphism. Jgraph may also be useful if the graph can be partitioned into disjoint subgraphs which are small enough to fit on one computing device. Locality control features of distributed graph processing may be used to place the entire subgraph on the same node, allowing any algorithm that runs on a DGraph in the previous model to be parallelized.

Neighborhood parallelism model may be useful for algorithms which perform local computation only, such as centrality measurements, or the like.

Distributed graph processing may provide an interface to allow a computing device to define a function that may be run in batch on every vertex in the graph. In an instance in which the function is called, the function input may be a TinkerGraph, e.g., an in-memory implementation of a property graph model interface, such as Blueprints, that contains one vertex labeled "root", and may contain other elements that the initiating computing device, or job submitter specifies when the function processing job is submitted. The computing device or job submitter may specify whether the TinkerGraph should contain the root vertex's immediate neighbors (or in/out neighbors in the case of a directed graph) and their edges with the root, as well as any properties of vertices or edges that should be fetched. The computing device or job submitter's function may write out new property values for the root vertex or any of its neighboring edges, new neighboring vertices and edges, or the like.

Neighborhood parallelism model may make it easy to write local-computation graph analytics which may take full advantage of the computing power of a plurality of computing devices. Distributed graph processing may run the computing device or job submitter function in parallel on each computing device using as many threads as the hardware on that computing device will support, optimizing SQL queries and inserts, caching frequently-used values, and/or minimizing network communication between nodes.

Communication for parallel processing may be provided by Java Messaging Service (JMS) using publish-subscribe method. Each computing device may operate may its own message broker, in order to eliminate centralized communication and potential bottlenecks Parallelizing message handling also eliminates a potential single point of failure in the system. Jobs may be executed in parallel on each computing device and the results are, optionally, returned back to the computing device submitting the job request.

Distributed graph processing may increase the performance of the computing devices which utilize the method. In an example embodiment a computing device, e.g., node, cluster is arranged including 16 servers which are equipped with quad-core Intel Xeon E5-2609 2.5 GHz processors, 64 GB 1600 MHz DDR3 RAM, and two 4.0 TB Seagate Constellation HDDs in RAID 0. The servers are running CentOS, and the distributed graph processing model is using MySQL 5.5 with the TokuDB storage engine as its data store.

Ingest speeds were measured by inserting large randomly generated Erdos-Renyi (E-R) graphs into the into the node cluster from an external machine. The E-R graphs consist of 100-vertex connected components with an average of 1000 edges each, the ingest speed of these graphs may depend on the number of vertices and edges, and not on the underlying structure of the graph.

E-R graphs are inserted with a total size varying from 100,000 vertices and one million edges to 100 million vertices and one billion edges. Ingest speed scaling as the size of a cluster grows is tested by repeating the ingest benchmarks using only 2, 4, and 8 nodes in addition to the full 16 nodes, as discussed above.

Figure 7:
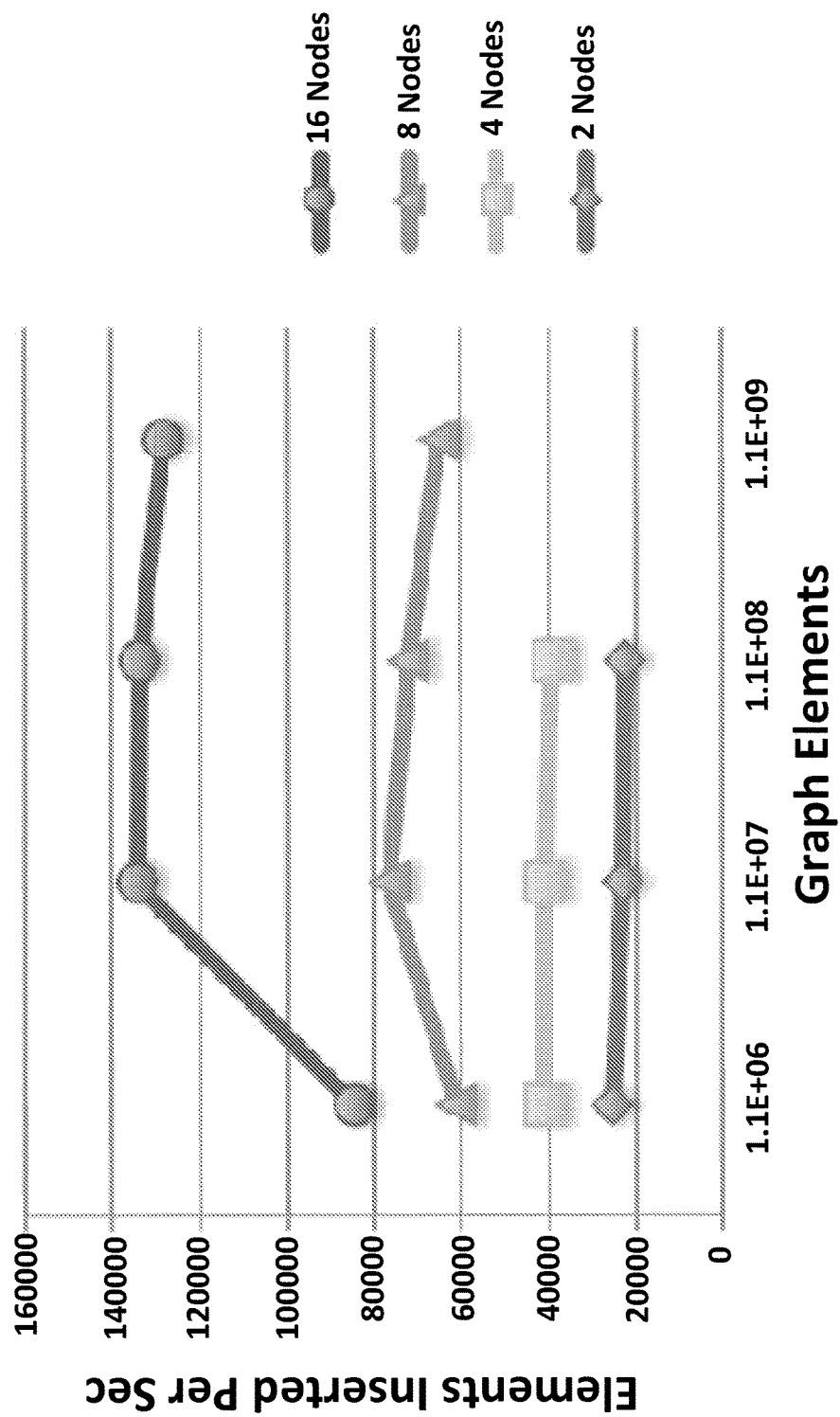
FIG. 7 illustrates ingest speeds with different numbers of nodes according to an example embodiment of the present invention.

FIG. 7 illustrates ingest speeds with different numbers of computing devices, e.g., nodes, according to an example embodiment of the present invention. The ingest speed is expressed as elements inserted per second, for graphs and clusters with varying numbers of nodes. The ingest speeds being approximately 20000 elements a second for 2 nodes at 1.1E+6, 1.1E+7, and 1.1E+8 and approximately 40000 elements a second for 4 nodes at 1.1E+6, 1.1E+7, and 1.1E+8. For 8 nodes the ingest speed is approximately 60000 at 1.1E+6, and approximately 700000 elements a second for 8 nodes at 1.1E+7 and 1.1E+8. The ingest speed for 16 nodes is approximately 90000 at 1.1E+6 and approximately 110000 at 1.1E+7, 1.1E+8, and 1.1E+9.

Although the 8 and 16 node cluster does not have time to reach its top speed when ingesting the smallest graph tested (which takes them 18 and 13 seconds, respectively), ingest speeds hold steady even as the input graphs grow to over a billion elements. The storage engine may have effects on the ingest speed, in some instances, a cache-oblivious storage engine, such as Tuko DB, may reduce input/output bottle necking. Additionally or alternatively, B-Tree based storage engines, such as InnoDB may be utilized.

Figure 8:
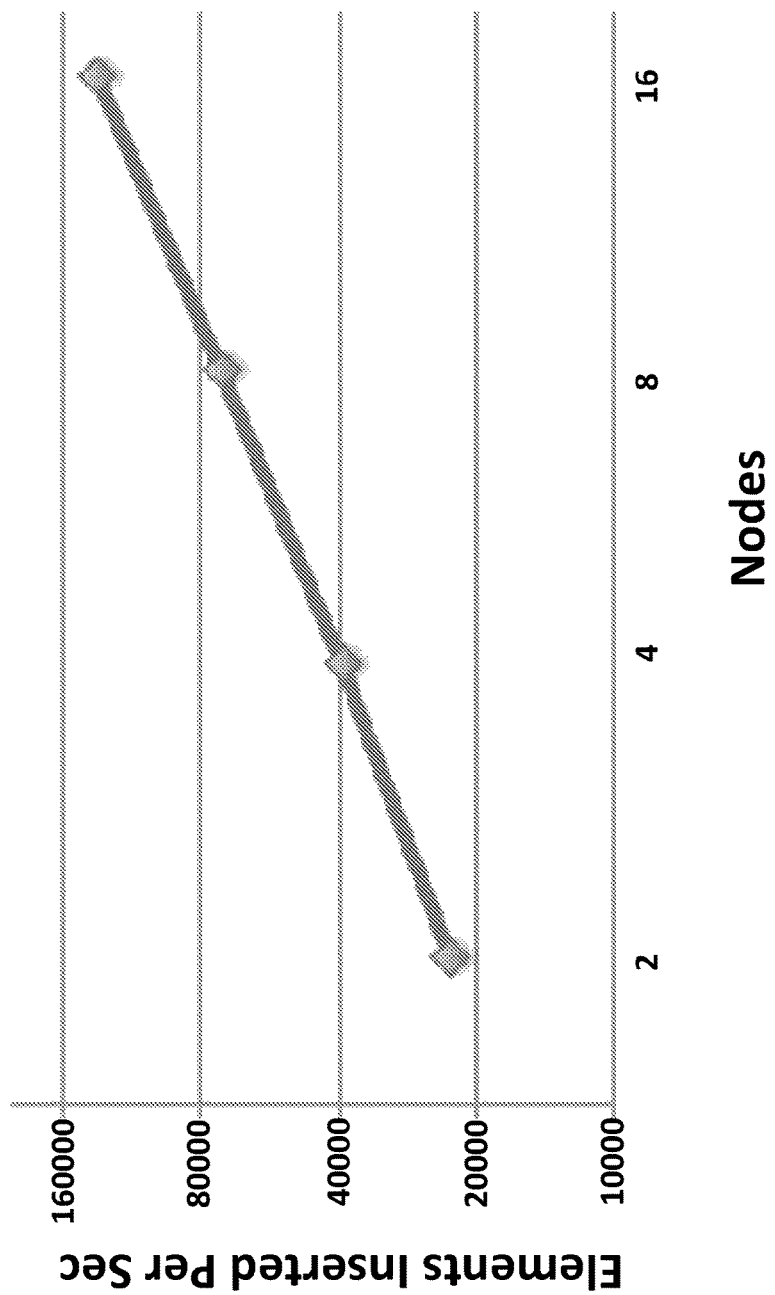
FIG. 8 illustrates ingest speeds on a logarithmic scale for varying cluster size according to an example embodiment of the present invention.

FIG. 8 illustrates ingest speeds on a logarithmic scale for varying cluster sizes according to an example embodiment of the present invention. The distributed graph processing may ingest an E-R graph with 10 million vertices and 100 million edges. The ingest speed scales linearly from 2 to at least 16 nodes from approximately 25000 elements a second to approximately 165000 elements a second.

Parallel processing capability may also be measured using a naive connected component algorithm. In an initial iteration, the algorithm assigns each vertex a component attribute equal to the smallest vertex id among itself and its neighbors. On subsequent iterations, the algorithm examines the component attribute of itself and its neighbors, and updates its component to be the smallest value in the examined set. The algorithm terminates when no vertex's component changes in an iteration.

The algorithm may be run on the graphs discussed above for ingestion speed, e.g., Erdos-Renyi graphs consisting of connected components with 100 vertices and an average of 1000 edges each, varying in total size from 1.1 million to 1.1 billion elements. The algorithm was run using 2, 4, and 8 nodes in the cluster in addition to the full 16 nodes.

Figure 9:
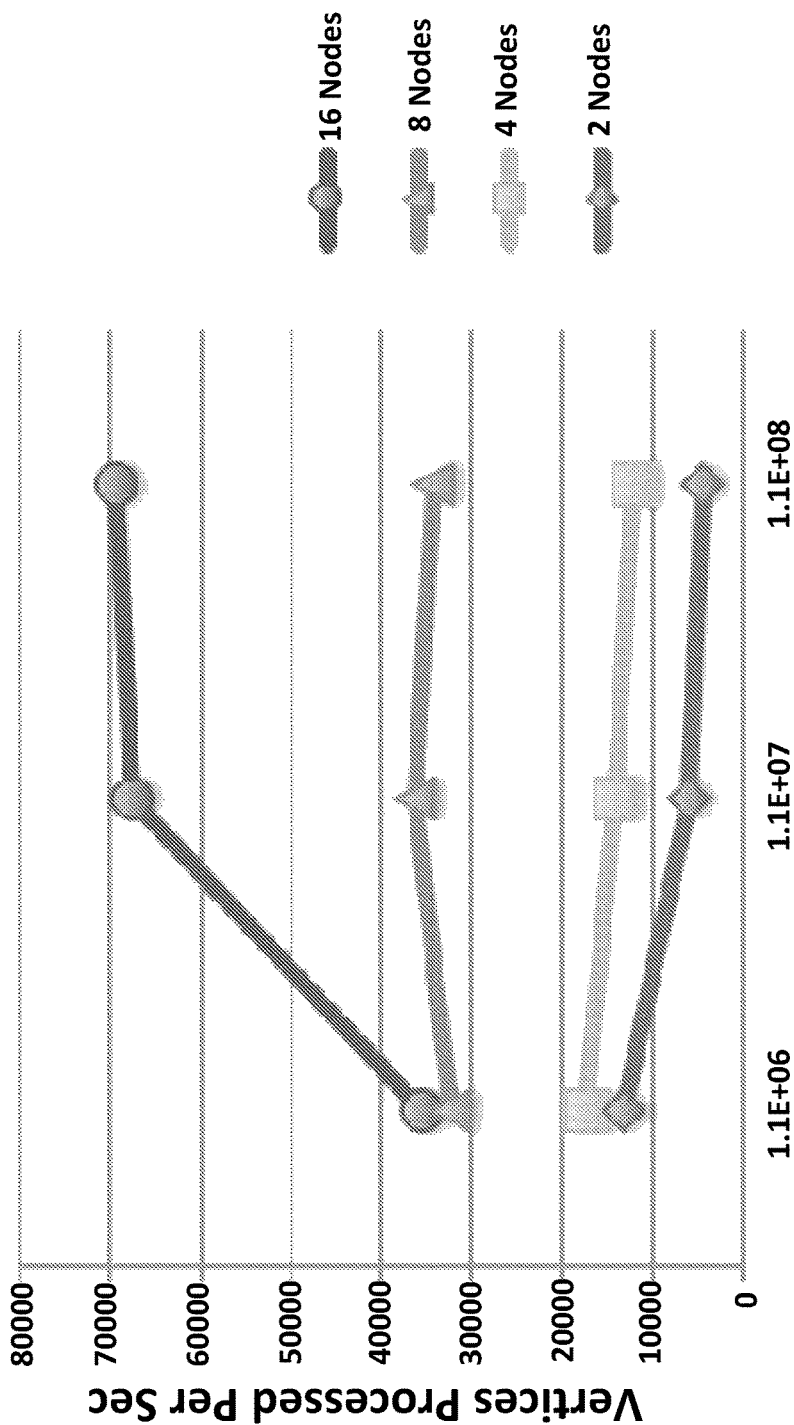
FIG. 9 illustrates the average processing speed in an example embodiment of the present invention.

FIG. 9 illustrates the average processing speed in an example embodiment of the present invention. The number of vertices processed per second, averaged over all iterations of the algorithm after the initial iteration, is on the y-axis. Processing a single vertex includes fetching its immediate neighborhood vertices (an average of 10 edges and vertices), as well as the component property for each vertex in the neighborhood. For 2 nodes the processing speed is approximately 15000 vertices processed per second at 1.1E+6 and approximately 5000 vertices processed per second at 1.1E+7 and 1.1E+8. For 4 nodes the processing speed decreased from approximately 20000 vertices processed per second to approximately 10000 vertices processed per second from 1.1E+6 graph elements to 1.1E+8 graph elements. For 8 nodes the processing speed is relatively constant at 35000 vertices processed per second. For 16 nodes the processing speed is approximately 35000 vertices processed per second at 1.1E+6 and approximately 70000 vertices processed per second at 1.1E+7 and 1.1E+8.

Figure 10:
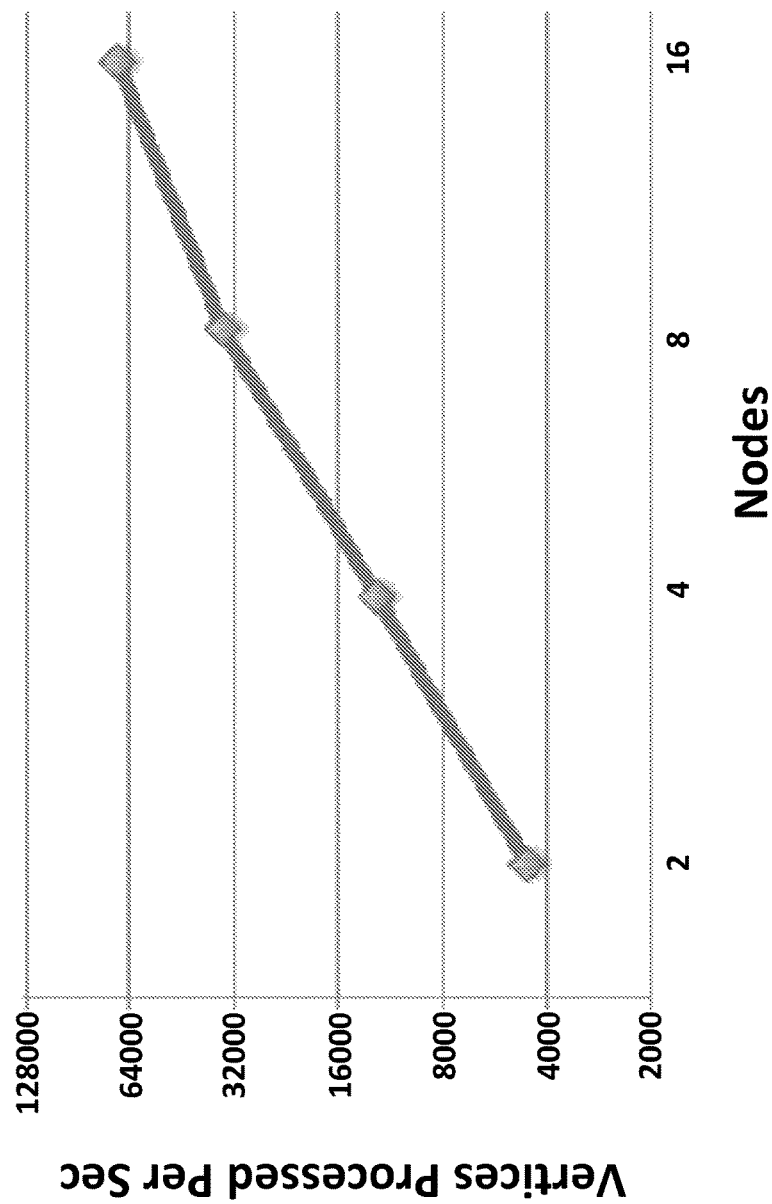
FIG. 10 illustrates average processing speeds on a logarithmic scale according to an example embodiment of the present invention.

FIG. 10 illustrates average processing speeds on a logarithmic scale according to an example embodiment of the present invention. The average processing speeds are depicted for an E-R graph with 10 million vertices and 100 million edges, with varying cluster sizes. The processing speed is approximately linear as nodes are added starting at approximately 4000 vertices processed per second for 2 nodes and ending at approximately 64000 vertices processed per second for 16 nodes. These results are qualitatively similar to the ingest results. FIG. 7 demonstrates that, once the graph is large enough to allow the 8 and 16 computing device node hardware clusters to reach full speed, processing speed holds steady up to graphs of over a billion elements. FIG. 10 demonstrates that processing speeds also scale in an approximately linear fashion up to a hardware cluster of 16 computing device nodes.

Example Distributed Graph Processing Flow Chart

Figure 11:
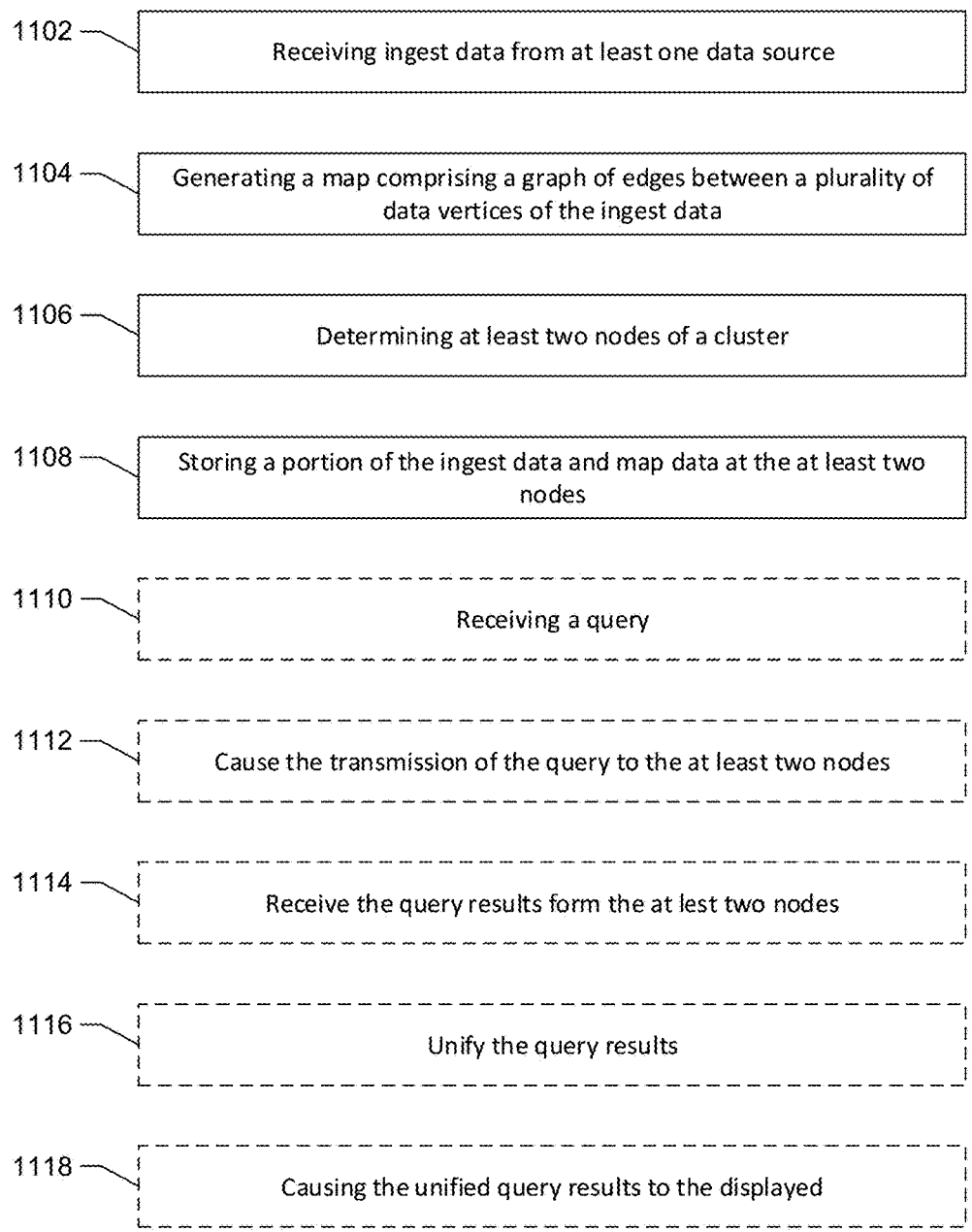
FIG. 11 illustrates a method for distributed graph processing in accordance with an example embodiment.

From a technical perspective, the graph processing module 44 described above may be used to support some or all of the operations described above. As such, the platform described in FIG. 2 may be used to facilitate the implementation of several computer program and/or network communication based interactions. As an example, FIG. 11 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention is shown in FIG. 11. The method may be employed for a multi-step selection interface. The method may include, receiving ingest data from at least one data source, at operation 1102. The method may also include generating a map comprising a graph of edges between a plurality of data vertices of the ingest data, at operation 1104. At operation 1106, the method may include determining at least two nodes of a cluster. The method, at operation 1108, may include storing a portion of the ingest data and map data at the at least two nodes.

In an example embodiment, the method may optionally include, as denoted by the dashed box, operation 1110, the method may include receiving a query. The method may also optionally include causing the transmission of the query to the at least two nodes, at operation 1112. The method may optionally include, receiving results from the at least two nodes at operation 1114 and unifying the results, at operation 1116. The method may additionally include causing the unified query results to be displayed.

In an example embodiment, an apparatus for performing the method of FIG. 11 above may comprise a processor (e.g., the processor 52) or processing circuitry configured to perform some or each of the operations (1102-1118) described above. The processor may, for example, be configured to perform the operations (1102-1118) by performing hardware implemented logical functions, executing stored instructions, or executing algorithms for performing each of the operations. In some embodiments, the processor or processing circuitry may be further configured for additional operations or optional modifications to operations 1102-1118. In this regard, for example in an example embodiment, the portion of the ingest data stored on a respective node of the at least two nodes is based on a specific data attribute. In some example embodiments, the method may also include receiving a query, causing transmission of the query to the at least two nodes, receiving query results from the at least two nodes, and unifying the query results. In an example embodiment, the method may also include causing the unified query results to be displayed. In an example embodiment, the query includes at least one structural constraint and at least one semantic constraint. In some example embodiments, a node comprises a computing device. In an example embodiment, generating the data map includes generating a vertex table and an edge table based on the ingest data. In some example embodiments, the generating the map data also includes defining a plurality of vertices and at least one relational edge between respective vertices of the plurality of vertices. In an example embodiment, storing the portion of ingest data and the portion of map data includes storing a respective vertex of the plurality of vertices to a respective node of the at least two nodes, and one or more attributes associated with the respective vertex is stored at the node at which the respective vertex is stored. In some example embodiments, the determining the at least two nodes is based on the storing the plurality of vertices such that vertices sharing at least one attribute are stored in a common cluster.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus for distributed graph processing comprising processing circuitry configured for:
   receiving ingest data from at least one data source;
   generating a data map comprising a graph of edges between a plurality of data vertices of the ingest data;
   determining at least two nodes of a cluster, wherein the at least two nodes are separate computing devices;
   generating a vertex table and an edge table based on the ingest data for each of the at least two nodes;
   storing a portion of the ingest data and a portion of the data map at the at least two nodes;
   receiving a query;
   transmitting the query to the at least two nodes, wherein one or more local searches based on the query are performed on each of the at least two nodes;
   executing the query by comparing edge table portions associated with each vertex without moving data;
   querying edge tables of each of the at least two nodes without communication between nodes, wherein a single query to an edge table is more computationally efficient than iterative querying the neighbors of each vertex on the at least two nodes; and
   receiving query results from the at least two nodes.

2. The apparatus of claim 1, wherein the portion of the ingest data stored on a respective node of the at least two nodes is based on a specific data attribute.

3. The apparatus of claim 1, wherein the processing circuitry is further configured for:
   unifying the query results; and
   causing the unified query results to be displayed.

4. The apparatus of claim 1, wherein the query comprises at least one structural constraint and at least one semantic constraint.

5. The apparatus of claim 1, wherein the generating the map data further comprises defining the plurality of vertices and at least one relational edge between respective vertices of the plurality of vertices.

6. The apparatus of claim 5, wherein storing the portion of ingest data and the portion of map data further comprises:
   storing a respective vertex of the plurality of vertices to a respective node of the at least two nodes,
   wherein one or more attributes associated with the respective vertex is stored at the node at which the respective vertex is stored.

7. The apparatus of claim 1, wherein the determining the at least two nodes is based on storing the plurality of vertices such that vertices sharing at least one attribute are stored in a common node.

8. The apparatus of claim 1, wherein the processing circuitry is further configured for:
   executing the local searches using memory proportional to the query in relation to the number of nodes executing the query.

9. The apparatus of claim 1, wherein the processing circuitry is further configured for:
   processing portions of the graph of edges in parallel without having to move data between nodes storing data.

10. The apparatus of claim 1, wherein the processing circuitry is further configured for:
    executing functions in parallel on the computing devices of each node of the at least two nodes using as many threads as the computing device will support, optimizing SQL queries and inserts, caching frequently-used values, and minimizing network communication between nodes.

11. The apparatus of claim 1, further comprising:
    a cluster of databases storing main data objects and associations as key-value pairs, wherein each attribute of a table is stored as a value and an identifier of a node of the at least two nodes as a key.

12. A method for distributed graph processing comprising:
    receiving ingest data from at least one data source;
    generating, using processing circuitry, a data map comprising a graph of edges between a plurality of data vertices of the ingest data;
    determining at least two nodes of a cluster, wherein the at least two nodes are separate computing devices;
    generating a vertex table and an edge table based on the ingest data for each of the at least two nodes;
    storing a portion of the ingest data and a portion of the data map at the at least two nodes;
    receiving a query;
    transmitting the query to the at least two nodes, wherein one or more local searches based on the query are performed on each of the at least two nodes;
    executing the query by comparing edge table portions associated with each vertex without moving data;
    querying edge tables of each of the at least two nodes without communication between nodes, wherein a single query to an edge table is more computationally efficient than iterative querying the neighbors of each vertex on the at least two nodes; and
    receiving query results from the at least two nodes.

13. The method of claim 12, wherein the portion of the ingest data stored on a respective node of the at least two nodes is based on a specific data attribute.

14. The method of claim 12, wherein the processing circuitry is further configured for:
    unifying the query results; and
    causing the unified query results to be displayed.

15. The method of claim 12, wherein the query comprises at least one structural constraint and at least one semantic constraint.

16. The method of claim 12, wherein the generating the map data further comprises defining the plurality of vertices and at least one relational edge between respective vertices of the plurality of vertices.

17. The method of claim 16, wherein storing the portion of ingest data and the portion of map data further comprises:
    storing a respective vertex of the plurality of vertices to a respective node of the at least two nodes,
    wherein one or more attributes of the respective vertex is stored at the node at which the respective vertex is stored.

18. The method of claim 12, wherein the determining the at least two nodes is based on the storing the plurality of vertices such that vertices sharing at least one attribute are stored in a common node.

* * * * *